United States Patent

Bourke

[11] Patent Number: 5,846,502
[45] Date of Patent: *Dec. 8, 1998

[54] MINI-CASCADE CATALYST SYSTEM

[75] Inventor: Mary Comben Bourke, Brighton, Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 586,353

[22] Filed: Jan. 16, 1996

[51] Int. Cl.⁶ .................................................. B01D 53/94
[52] U.S. Cl. .................................. 423/213.5; 423/213.7; 422/171; 422/180
[58] Field of Search ........................... 423/213.5, 213.7; 422/171, 177, 180

[56] References Cited

U.S. PATENT DOCUMENTS

| | | | |
|---|---|---|---|
| 4,072,471 | 2/1978 | Morgan et al. | 423/213.5 |
| 5,083,427 | 1/1992 | Anderson | 60/274 |
| 5,106,588 | 4/1992 | Sims et al. | 422/180 |
| 5,332,554 | 7/1994 | Yasaki et al. | 422/177 |
| 5,376,610 | 12/1994 | Takahata et al. | 423/213.7 |
| 5,510,086 | 4/1996 | Hemingway et al. | 422/171 |

OTHER PUBLICATIONS

Ball, D.J., et al. "Warm–up and Underfloor Converter Parametric Study", SAE Paper 932765 (1993), pp. 179–189.

Paul. M. Laing, "Development of an Alternator–Powered Electrically–Heated Catalyst System", (SAE Paper 941042). (1994).

*Primary Examiner*—Gary P. Straub
*Assistant Examiner*—Peter DiMauro
*Attorney, Agent, or Firm*—Lorraine S. Melotik

[57] ABSTRACT

A catalyst system for converting hydrocarbons, carbon monoxide and nitrogen oxides contained in exhaust gas generated by an internal combustion engine. The catalyst system comprises: first, second, and third catalyst bricks arranged in series in an exhaust gas passage of an internal combustion engine downstream of an exhaust gas manifold. The first brick has the smallest volume and is closely coupled to an exhaust gas manifold of the engine and the first catalyst brick is positioned adjacent to and spaced apart from the second catalyst brick by a predetermined distance of no more than 10 inches. Each catalyst brick individually comprises a substrate material coated with a metallic catalyst carried on a porous support, wherein the metallic catalyst provided on the first brick comprises palladium.

15 Claims, 1 Drawing Sheet

MINI-CASCADE CATALYST SYSTEM

FIELD OF THE INVENTION

This invention is a catalyst system which includes three separate catalysts bricks arranged in series in an exhaust gas passage of an internal combustion engine, the first being close coupled to the engine exhaust gas manifold and the second being closely adjacent the first.

BACKGROUND OF THE INVENTION

California low emission vehicle standards to be implemented in the future require a significant reduction in tailpipe hydrocarbon and nitrogen oxide emission levels from present acceptable levels. The standards also are becoming more stringent for in-use emission performance and require in the future compliance up to 100,000 miles of vehicle service. Hydrocarbon (HC) emissions can occur during the cold start period of the engine when fuel-rich operation is needed and the normal exhaust treatment catalyst has not reached the "lightoff" temperature necessary for its efficient operation. Until that time, unburnt or partially burnt engine-out hydrocarbon emissions can exit to the atmosphere.

A variety of techniques have been suggested to reduce the cold start HC emissions. One involves a cascade arrangement with an electrically heated catalyst as disclosed in (SAE paper 941042) entitled "Development of an Alternator-Powered Electrically-Heated Catalyst System". In typical cascade arrangements, such as disclosed in this reference, the system consists of two bricks, one small brick followed by one relatively large brick. The small brick, which is contacted first by the exhaust gases, is heated electrically during cold starting to improve its efficiency during this time. Electrically heating the catalyst, however, may be expensive and raise durability questions. Hydrocarbon traps are also being investigated to adsorb the hydrocarbons during cold-start. Commonly available traps suffer from the deficit of not able to adsorb the low molecular weight hydrocarbons and trapping systems often suffer from sufficient durability and control capability.

The close-coupling of a catalyst brick (i.e., a catalyst carried on a porous support and coated on a substrate) appears to represent the least complex and costly of the solutions to cold start HC conversion. By placing the catalyst brick close to the exhaust manifold, the temperatures in the catalyst brick quickly rise to the light-off temperature of the catalyst. When the catalyst reaches its light-off temperature, carbon monoxide and hydrocarbons begin to be effectively converted to desirable inert gases. There are difficulties, however, associated with a conventional close-coupled catalyst. For example, "packaging" a large catalyst brick close-coupled to the exhaust gas manifold presents difficulties due to the limited space available near the exhaust manifold. This type of close-coupled system also presents problems with catalyst monitoring capability since, in traditional close coupled systems, a large brick is used which does not provide the sensitivity necessary to detect a loss of catalyst activity of the brick. Another problem with such systems is the lack of high temperature durability of many of the catalyst materials when they are placed very close to the exhaust manifold.

The present invention overcomes the deficiencies of prior art systems and provides a catalyst system which rapidly and efficiently converts hydrocarbons during-cold starting of the engine, has excellent durability, and overcome packaging issues associated with using a large brick near the exhaust manifold as in a conventional close-coupled catalyst brick design.

DISCLOSURE OF THE INVENTION

The invention is a catalyst system for converting hydrocarbons, carbon monoxide and nitrogen oxides contained in exhaust gas generated by an internal combustion engine. The catalyst system comprises: first, second, and third catalyst bricks arranged in series in an exhaust gas passage of the internal combustion engine downstream of an exhaust gas manifold. The first brick has the smallest volume and is closely coupled to an exhaust gas manifold of the engine. The first brick is positioned adjacent to and spaced apart from the second brick by a predetermined distance of no more than about 10 inches. Preferably, the third brick is larger in volume than the second catalyst brick. Optimally, the second and third catalysts bricks are positioned as close to one another as allowed by packaging. Each catalyst brick individually comprising a substrate coated with a metallic catalyst carried on a porous support; wherein the metallic catalyst carried on said first brick comprises palladium.

Optimally the first catalyst brick consists essentially of palladium and employs a washcoat devoid of ceria. The latter feature provides excellent hydrocarbon conversion, even at cold-starting, and high temperature durability. According to another aspect of the invention, it comprises a method for converting the exhaust gases by exposing it to the disclosed catalyst system.

DETAILED DESCRIPTION OF THE PREFERRED EMBODIMENTS

Figure 1:
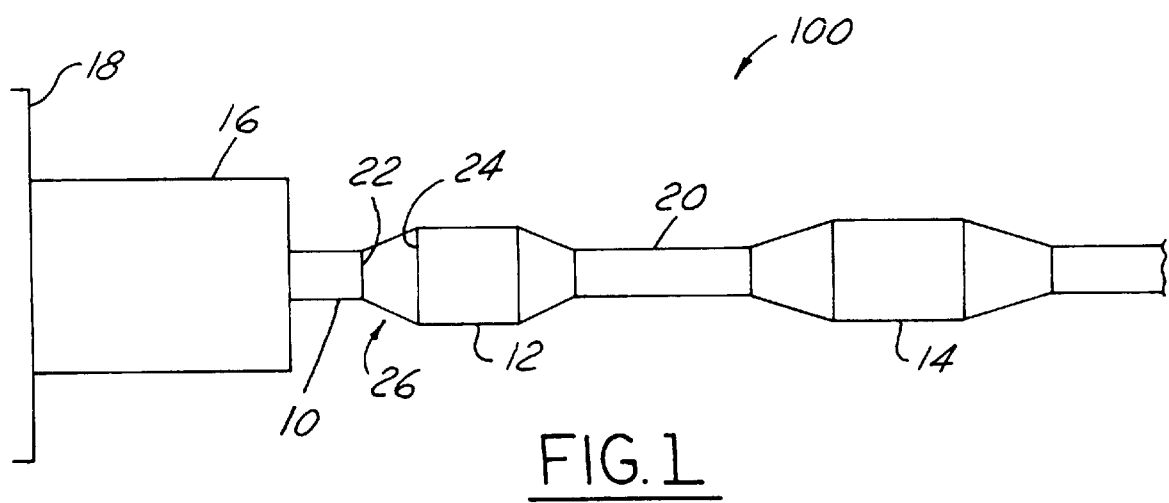
FIG. 1 is an embodiment of a mini-cascade system according to the present invention.

The invention can be most easily understood by referring to one embodiment of the invention catalyst system (100) shown schematically in FIG. 1. The catalyst system comprises three catalyst bricks labeled 10, 12, and 14 located in series downstream of an exhaust manifold 16 of an engine 18 in an exhaust gas passage 20. As would be apparent, exhaust gas generated by the engine would travel in sequence through catalysts bricks 10, 12, and 14.

By "catalyst brick" herein is meant a substrate made of e.g., a ceramic material and which has a coating of a metallic catalyst such as palladium. In use, as is known in the art, the metallic catalyst would optimally be carried on a porous support material. These materials will be described in more detail below.

The first catalyst brick 10 has the smallest brick volume and is close-coupled to the engine exhaust manifold 16. The volume of the third catalyst brick 14 is the same or larger than that of catalyst brick 12. The distance between the first and second catalyst bricks is smaller than the distance between the second and third catalyst bricks. For this invention, the first and second bricks are positioned together so that the distance between them is minimal. In particular, the first brick is positioned adjacent to and spaced apart from the second brick by a predetermined distance of no more than about 10 inches. Preferably, this predetermined distance is no more than 6 inches. This distance is measured between the two adjacent faces 22, 24, respectively, of the first and second catalyst bricks.

In one particular embodiment, the first catalyst brick has a volume of about 18 to 38 cubic inches, the second catalyst brick has a volume of about 38 to 55 cubic inches, and the third catalyst brick has a volume of about 38 to 92 cubic inches. More particularly, according to one preferred embodiment, the respective volumes are 25, 38, and 75 cubic inches.

Figure 2:
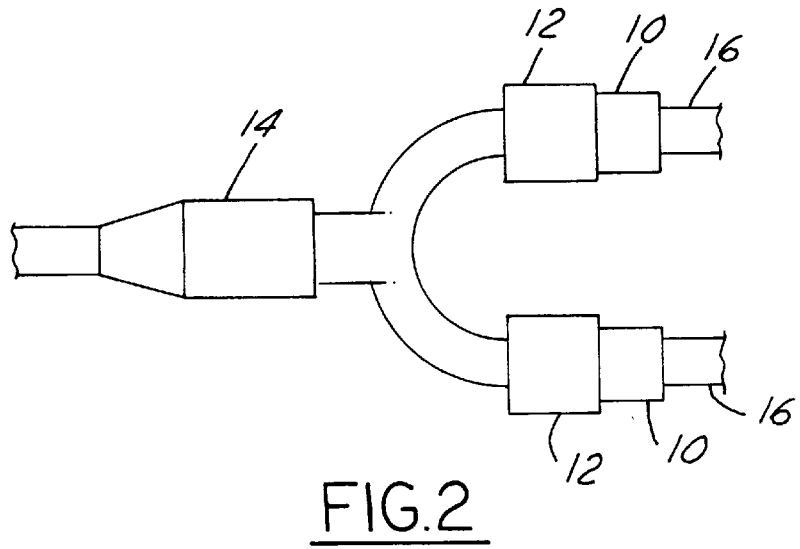
FIG. 2 is another embodiment of a mini-cascade system according to the present invention, in which the system is used with an engine having two exhaust manifolds.

It is necessary that bricks 10 and 12 be close to one another in order to encourage all of the exothermic energy created when the first brick lights-off to substantially transfer ("cascade") to the second brick to help light-off the second brick. Thus, as shown in FIG. 1, the exhaust gas outlet of the first brick optimally would lead directly into the inlet cone 26 of the second brick in order to minimize loss of heat energy out of the passage by thermal conduction. By positioning the first and second catalyst bricks in this way, the exhaust gas heat energy is most efficiently utilized to heat the first and second bricks. FIG. 2 schematically depicts another embodiment of the mini-cascade catalyst system of the present invention. In this embodiment, provisions are made for engines having two exhaust gas manifolds as in V-6 and V-8 engines.

As is well known in the art, for useful application in an exhaust system, the catalyst is carried on a substrate of a high temperature stable, electrically insulating material ("brick" material). Typical of such substrates are ceramics like cordierite, mullite, etc. The substrate may also be made of metallic foil comprised of materials such as iron, chrome and aluminum. The brick may be in any suitable configuration, often being employed as a monolithic honeycomb structure, spun fibers, corrugated foils or layered materials. Still other ceramic materials and configurations useful in this invention and suitable in an exhaust gas system will be apparent to those skilled in the art in view of the present disclosure. I have found that ideally, when the first brick is a channeled ceramic brick, the walls between the channels are thin-walled, i.e., about 0.14 mm, so as to provide optimum vehicle power in view of the backpressure considerations associated with close coupling a small brick. In this thin-walled ceramic brick, preferably the cell density of the substrate material is no more than 350 cells per square inch, with cells having a square cross-section. This provides larger cell size as compared to traditional substrate materials. This is in comparison to traditional ceramic substrates which have larger wall thicknesses, e.g., about 0.16 mm, and larger cell density, e.g., 400 cells per square inch (which provides smaller cells). If a metallic substrate is used in the first brick, rather than ceramic as discussed above, the metallic brick can have a higher cell density since the preferred wall thickness of the comparative metallic substrates are approximately 0.05 mm, while providing for similar performance. The second and third catalyst bricks need not have these discussed preferred wall thickness or preferred cell size but can be made of the smaller cell size materials, e.g., having 400 cell per square inch.

Particularly desirable metallic catalyst materials are the precious metals, palladium, platinum, rhodium, and mixtures thereof. These catalysts are carried on a porous support. Generally, the catalyst support material is a high surface area support material like alumina, zirconia, or ceria, with gamma-alumina being particularly preferred. Often such support materials are mixed with stabilizers and promoters like ceria, barium and nickel. The loading of the catalyst precious metal(s) on the support varies with the particular brick on which it is carried. For example, optimally the first brick is more heavily loaded with the metallic catalyst than are either the second or third bricks of the invention system.

One common way to provide the catalyst metal onto the substrate is as follows. First the porous support material is impregnated with a solution of precursor compounds for the metallic catalyst using incipient wetness techniques. The solution can be water or organic solvent based. For example, to load platinum onto gamma-alumina, the alumina may be impregnated with an aqueous solution of hexachloplatinic acid. After impregnation, the material is dried and calcined. If the porous support is other than ceria, e.g., gamma-alumina, it may be desirable to also incorporate via impregnation some rhodium and/or ceria into the platinum containing phase. The catalyst metal loaded support material could then be washcoated onto the substrate, e.g., the monolith. Alternately, the porous support could be washcoated first onto the substrate and then, after drying and calcination, be impregnated with the desired metals, e.g., platinum.

According to one preferred embodiment of the present invention, the metallic catalyst material provided on the first catalyst brick consists essentially of palladium. Most desirably, in this embodiment the first brick would carry a loading of at least 200 g/ft$^3$ of a palladium based on the porous support, most particularly being at least about 225 g/ft$^3$. Generally, alumina is employed as the porous support. Optimally, the porous support material of the first brick does not include ceria which is often conventionally present in catalyst support materials. I have found that using a ceria-less support material, for catalyst materials consisting essentially of palladium, results in a catalyst having excellent high temperature stability. Use of a ceria-less/palladium only combination would be most preferred in those situations in which the temperature of the first brick would exceed 1000° C. during engine operation. At high temperatures, ceria tends to grow into large particles which have reduced surface area. As would be appreciated by those skilled in the art, high surface area is a desirable attribute for a catalyst support. Improving the high temperature stability of the catalyst means that the catalyst on the first brick is able to have excellent hydrocarbon conversion activity for a long period of time, which would be its primary function rather than acting as a three-way catalyst.

In the above described embodiment of the palladium only catalyst/ceria-less support, optimally the second and third bricks would also use a palladium-only catalyst material formulation but in lower loadings than that provided on the first brick. The second and third bricks, which desirably have a lower loading, should optimally have, however, a catalyst loading minimum of at least 100 g/ft$^3$ (catalyst/porous support) to maximize lightoff potential while minimizing catalyst cost. The second and third bricks optimally would contain ceria in the washcoat porous support material and hence act as three-way converters. The optimal loading of metallic catalysts, preferably being individually selected from precious metals and mixtures thereof, on each of the three bricks would be apparent to those skilled in the art in view of the present disclosure. Its selection in type and amount depends, e.g., on the hydrocarbons in the exhaust gas and exhaust gas energy management at cold-start.

On particular advantage enjoyed by the present invention mini-cascade catalyst system is that the catalyst can be monitored to determine its efficiency. This can be done because the first brick does not have good oxygen storage capability and the second brick is small enough for high sensitivity detection of catalyst inefficiency. In contrast, in a conventional cascade system where the second brick is very large, it is not possible to successfully determine if the system has become inefficient because of the dampening effect of that large brick.

EXAMPLE

A catalyst system according to one embodiment of the present invention was assembled as in FIG. 1 and made as follows: The first brick comprises an 25 cubic inch brick with 225 g/ft3 of palladium only on a ceria-less porous support of alumina. The substrate is made of ceramic and is a thin-walled brick where the wall thickness is 0.14 mm. The second brick is made with a ceramic substrates of 38 cubic inches which carries 110 g/ft3 of a palladium three-way catalyst carried on a typical porous support of alumina of ceria. The third brick has a volume of 75 cubic inches and is loaded with 110 g/ft3 palladium using a washcoat of alumina+ceria on a ceramic substrate. The bricks were arranged in order to form a mini-cascade system.

This embodiment of a present invention mini-cascade system was installed on an automotive vehicle using a 1.9 L engine. The first brick was 9 inches from the exhaust port. The first and second brick were arranged within 3 inches of each other and the third brick was 10 inches from the second brick. The vehicle with this embodiment of the system was subjected to Federal Test Procedure 75. The tailpipe emission levels with non-aged components (new) (g/mi) were found to be excellent, Non-methane hydrocarbons (NMHC), 0.016; CO, 0.56; and NOx, 0.05. Although results with the non-aged system do not depict emission degradation under real world operating conditions, potential capability is encouraging.

These low levels were achieved, it is believed, due to the particular features of the present invention embodiment which result in the outstanding lightoff of the mini-cascade system. The first brick is small and has a small frontal area so that the front face heats up very quickly which allows it to reach lightoff temperature very quickly as well. Once the exothermic reactions begin in this brick, the subsequent bricks are heated as a result of this exothermic energy and they also become catalytically reactive. This phenomena causes the entire system to become efficient quickly which greatly reduces the cold start emissions levels. This particular system embodiment was found to be 90% efficient at converting hydrocarbons in 32 seconds after cold starting during the FTP 75.

I claim:

1. A catalyst system for converting hydrocarbons, carbon monoxide and nitrogen oxides contained in exhaust gas generated by an internal combustion engine, said catalyst system comprising;
   first, second, and third catalyst bricks arranged in series in an exhaust gas passage of said internal combustion engine downstream of an exhaust gas manifold such that said first brick has the smallest volume and is closely coupled to an exhaust gas manifold of said engine and wherein said first catalyst brick is positioned adjacent to and spaced apart from said second catalyst which brick by a distance of no more than 10 inches, each catalyst brick individually comprising a substrate material coated with a metallic catalyst carried on a porous support wherein said metallic catalyst provided on said first brick comprises palladium in an amount of at least 200 g/ft$^3$ based on the porous support and the second and third catalyst bricks each have a catalyst loading of at least 100 g/ft$^3$ and below 200 g/ft$^3$ of palladium based on the porous support.

2. The catalyst system according to claim 1 wherein the volume of the third brick is equal to or larger than that of said second brick.

3. The catalyst system according to claim 1 wherein said distance is less than 6 inches.

4. The catalyst system according to claim 1 wherein the metallic catalyst present on each of said catalyst bricks consists essentially of palladium.

5. The catalyst system according to claim 2 wherein said first catalyst brick has a volume of about 18 to 38 cubic inches, said second catalyst brick has a volume of about 38 to 55 cubic inches, and said third catalyst brick has a volume of about 38 to 92 cubic inches.

6. The catalyst system according to claim 1 wherein said support material is selected from the group consisting of alumina, zirconia, gamma-alumina, and ceria, and optionally including stabilizers therefor.

7. The catalyst system according to claim 1 wherein said support material of said first brick is selected from the group consisting of alumina, zirconia, gamma-alumina, and mixtures thereof.

8. A catalyst system for converting hydrocarbons, carbon monoxide and nitrogen oxides contained in exhaust gas generated by an internal combustion engine, said catalyst system comprising:
   first, second, and third catalyst bricks arranged in series in an exhaust gas passage of said internal combustion engine downstream of an exhaust gas manifold of said engine and wherein said first catalyst brick has the smallest volume and is closely coupled to an exhaust gas manifold of said engine and wherein said first catalyst brick is positioned adjacent to and spaced apart from said second catalyst brick by a distance of no more than 10 inches, each catalyst brick individually comprising a substrate material coated with a metallic catalyst carried on a porous support wherein said metallic catalyst provided on said first brick consists essentially of palladium in a loading of at least 200 g/ft$^3$ based on a porous support which is ceria-less and the second and third catalyst bricks each have a catalyst loading of at least 100 g/ft$^3$ and below 200 g/ft$^3$ of palladium based on the porous support.

9. A method for converting hydrocarbons, carbon monoxide and nitrogen oxides contained in exhaust gas generated by an internal combustion engine, said method comprising the steps of:
   providing a catalyst system in an exhaust gas passage of an internal combustion engine, said system comprising:
      first, second, and third catalyst bricks arranged in series in an exhaust gas passage of said internal combustion engine downstream of an exhaust gas manifold such that first brick has the smallest volume and is closely coupled to an exhaust gas manifold of said engine and wherein said first catalyst brick is positioned adjacent to and spaced apart from said second catalyst brick by a distance of no more than 10 inches, each catalyst brick individually comprising a substrate material coated with a metallic catalyst carried on a porous support wherein said metallic catalyst provided on said first brick comprises palladium in an amount of at least 200 g/ft$^3$ based on the porous support and the second and third catalyst bricks each have a catalyst loading of at least 100 g/ft$^3$ and below 200 g/ft$^3$ of palladium based on the porous support;
   exposing said catalyst system to exhaust gases generated by said engine.

10. The method according to claim 9 wherein the volume of the third brick is equal to or larger than that of said second brick.

11. The method according to claim 9 wherein said distance is less than 6 inches.

12. The method according to claim 9 wherein the metallic catalyst present on each of said catalyst bricks consists essentially of palladium.

13. The method according to claim 10 wherein said first catalyst brick has a volume of about 18 to 38 cubic inches, said second catalyst brick has a volume of about 38 to 55 cubic inches, and said third catalyst brick has a volume of about 38 to 92 cubic inches.

14. The method according to claim 9 wherein said support material is selected from the group consisting of alumina, zirconia, gamma-alumina, and ceria, and optionally including stabilizers therefor.

15. The method according to claim 9 wherein said support material of said first brick is a material selected from the group consisting of alumina, zirconia, gamma-alumina, and mixtures thereof.

* * * * *